United States Patent
Kim

(10) Patent No.: US 9,304,529 B2
(45) Date of Patent: Apr. 5, 2016

(54) APPARATUS FOR REDUCING EFFORT OF CLUTCH PEDAL FOR VEHICLE

(71) Applicant: Hyundai Motor Company, Seoul (KR)

(72) Inventor: Eun Sik Kim, Gwangmyeong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/330,822

(22) Filed: Jul. 14, 2014

(65) Prior Publication Data

US 2015/0153760 A1    Jun. 4, 2015

(30) Foreign Application Priority Data

Dec. 3, 2013 (KR) ................. 10-2013-0149370

(51) Int. Cl.
 G05G 1/44 (2008.04)
 B60K 23/02 (2006.01)
 G05G 5/03 (2008.04)

(52) U.S. Cl.
 CPC ......... *G05G 1/44* (2013.01); *B60K 23/02* (2013.01); *G05G 5/03* (2013.01); *Y10T 74/20528* (2015.01)

(58) Field of Classification Search
 CPC ............... Y10T 74/20528; Y10T 74/20534; Y10T 74/2054; Y10T 74/20888; G05G 1/445; G05G 1/46; G05G 1/327; G05G 1/44; G05G 1/40; G05G 1/38; G05G 1/30; G05G 5/03; G05G 5/05; B60K 23/02
 See application file for complete search history.

(56) References Cited

U.S. PATENT DOCUMENTS

| | | | |
|---|---|---|---|
| 2,111,686 A * | 3/1938 | Wilbur | 477/216 |
| 2,551,743 A * | 5/1951 | Huey | 477/194 |
| 3,261,438 A * | 7/1966 | Binder | 192/99 S |
| 2005/0247158 A1* | 11/2005 | Willemsen et al. | 74/513 |
| 2009/0000418 A1* | 1/2009 | Kim et al. | 74/512 |

FOREIGN PATENT DOCUMENTS

| | | | |
|---|---|---|---|
| GB | 2055180 A | * | 2/1981 |
| JP | 04-349514 A | | 12/1992 |
| JP | 7-52690 B2 | | 6/1995 |
| KR | 1998-050862 A | | 9/1998 |
| KR | 100820241 B1 | | 4/2008 |
| KR | 10-0851323 B1 | | 8/2008 |
| KR | 10-0927695 B1 | | 11/2009 |
| KR | 100926035 B1 | | 11/2009 |
| WO | WO 02/067072 A1 | | 8/2002 |

* cited by examiner

*Primary Examiner* — Daniel Yabut
(74) *Attorney, Agent, or Firm* — Morgan, Lewis & Bockius LLP

(57) ABSTRACT

An apparatus for reducing a clutch pedal effort for a vehicle may include a pedal arm lever provided at an upper portion of a pedal arm and protruding forward, a torsion lever, one end of which is installed to be rotatable with respect to a pedal member and positioned at a front side of the pedal arm lever, and a back force link that is rotatably installed in the pedal member between the pedal arm lever and the torsion lever so that one end is connected to the pedal arm lever and the other end contacts the torsion lever, and that decreases the effort by generating turnover force when the pedal arm rotates forward and increases return force when the pedal arm rotates backward.

5 Claims, 6 Drawing Sheets

APPARATUS FOR REDUCING EFFORT OF CLUTCH PEDAL FOR VEHICLE

CROSS-REFERENCE TO RELATED APPLICATION

The present application claims priority of Korean Patent Application Number 10-2013-0149370 filed on Dec. 3, 2013, the entire contents of which application are incorporated herein for all purposes by this reference.

BACKGROUND OF INVENTION

1. Field of Invention

The present invention relates to an apparatus for reducing a clutch pedal effort for a vehicle, and more particularly, to a technology associated with an apparatus for reducing a clutch pedal effort for a vehicle which can reduce an effort felt by a driver in operating a pedal and is usable without damage to a part even in a vehicle using a high-powered engine having a high output.

2. Description of Related Art

In a manual transmission vehicle, in a state in which a clutch disk and a flywheel are connected to each other so as to transfer power, power of an engine can be smoothly transferred to a transmission only when a slip does not occur between the clutch disk and the flywheel.

Meanwhile, as vehicle performance is improved, a high-powered engine having a high output is gradually used, and when the high-powered engine is used, the spring force of a diaphragm needs to be further increased than the related art for complete connection of the clutch disk and the flywheel. Therefore, there is a scheme that increases a diameter of a turnover spring in order to increase the spring force.

However, when the spring force of the turnover spring is increased, an effort applied to a clutch pedal is increased, and as a result, fatigue of a driver caused by operating the pedal is relatively increased, and in particular, when diameter of the turnover spring is increased, a concentrative load applied to the turnover spring is increased, parts including a spring bush and the like connecting the turnover spring and a pedal member are easily broken.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide an apparatus for reducing a clutch pedal effort for a vehicle that can reduce an effort felt by a driver in operating a clutch pedal and is usable without damage to a part even in a vehicle using a high-powered engine having a high output.

In various aspects of the present invention, the present invention provides an apparatus for reducing a clutch pedal effort for a vehicle, including: a pedal arm lever provided at an upper portion of a pedal arm and protruding forward; a torsion lever, one end of which is installed to be rotatable with respect to a pedal member and positioned at a front side of the pedal arm lever; and a back force link that is rotatably installed in the pedal member between the pedal arm lever and the torsion lever so that one end is connected to the pedal arm lever and the other end contacts the torsion lever, and that decreases the effort by generating turnover force when the pedal arm rotates forward and increases return force when the pedal arm rotates backward.

The apparatus may further include a lever shaft fixedly installed in the pedal member by integrally penetrating the lower end of the torsion lever and both surfaces of the pedal member, and served as a rotation center of the torsion lever, and a torsion spring which is wound on the lever shaft and is installed with one end coupled to the lever shaft and the other end coupled to the torsion lever, and which provides elastic force to the torsion lever so that the torsion lever maintains a continuous contact state with the back force link.

The torsion lever may be installed to be inclined with a lower end of the torsion lever coupled to the pedal member and positioned to the front side further than an upper end to maintain a continuous contact state with the back force link when the pedal arm rotates.

A surface of the torsion lever that contacts the back force link may include an inclination surface at an upper end of the torsion lever and inclining downward, a sliding surface at a lower end of the torsion lever, and a protrusion protruding from the torsion lever between the inclination surface and the sliding surface, wherein the protrusion generates the turnover force in the pedal arm and increases the return force by actuation with the back force link.

The back force link may include an intermediate portion which is positioned between the pedal arm lever and the torsion lever and penetrated by a link shaft fixed to the pedal member, a front rod portion which is extended to an upper front side from the intermediate portion and coupled to a link pin that contacts the protrusion and the sliding surface of the torsion lever, and a rear rod portion which is extended to an upper rear side from the intermediate portion, has a link slot formed in a longitudinal direction of the rear rod portion, and is connected with the pedal arm lever through a lever connection pin that moves along the link slot while integrally penetrating the link slot and the pedal arm.

The link shaft may be positioned lower than the link pin to generate the turnover force in the pedal arm and increase the return force when the pedal arm is actuated, and the lever connection pin may be positioned between the link shaft and the link pin. The link slot may be formed in a substantially straight-line shape in the longitudinal direction of the rear rod portion so that the back force link rotates around the link shaft when the pedal arm rotates.

According to various aspects of the present invention, the effort of a driver can be significantly reduced when a pedal arm operated by the driver is rotated, and as a result, fatigue of the driver from operating a pedal can be significantly reduced, and further, a complete return of the pedal arm can be induced in an initial operation or a rear return of the pedal arm to achieve a more complete connection between a clutch disk and a flywheel, thereby sufficiently using an apparatus for reducing a clutch pedal effort for a vehicle without damage to a part even in a high-powered vehicle having a high output.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to exemplary embodiments thereof illustrated by the accompanying drawings which are given hereinbelow by way of illustration only, and thus are not limitative of the present invention, and wherein.

Figure 1:
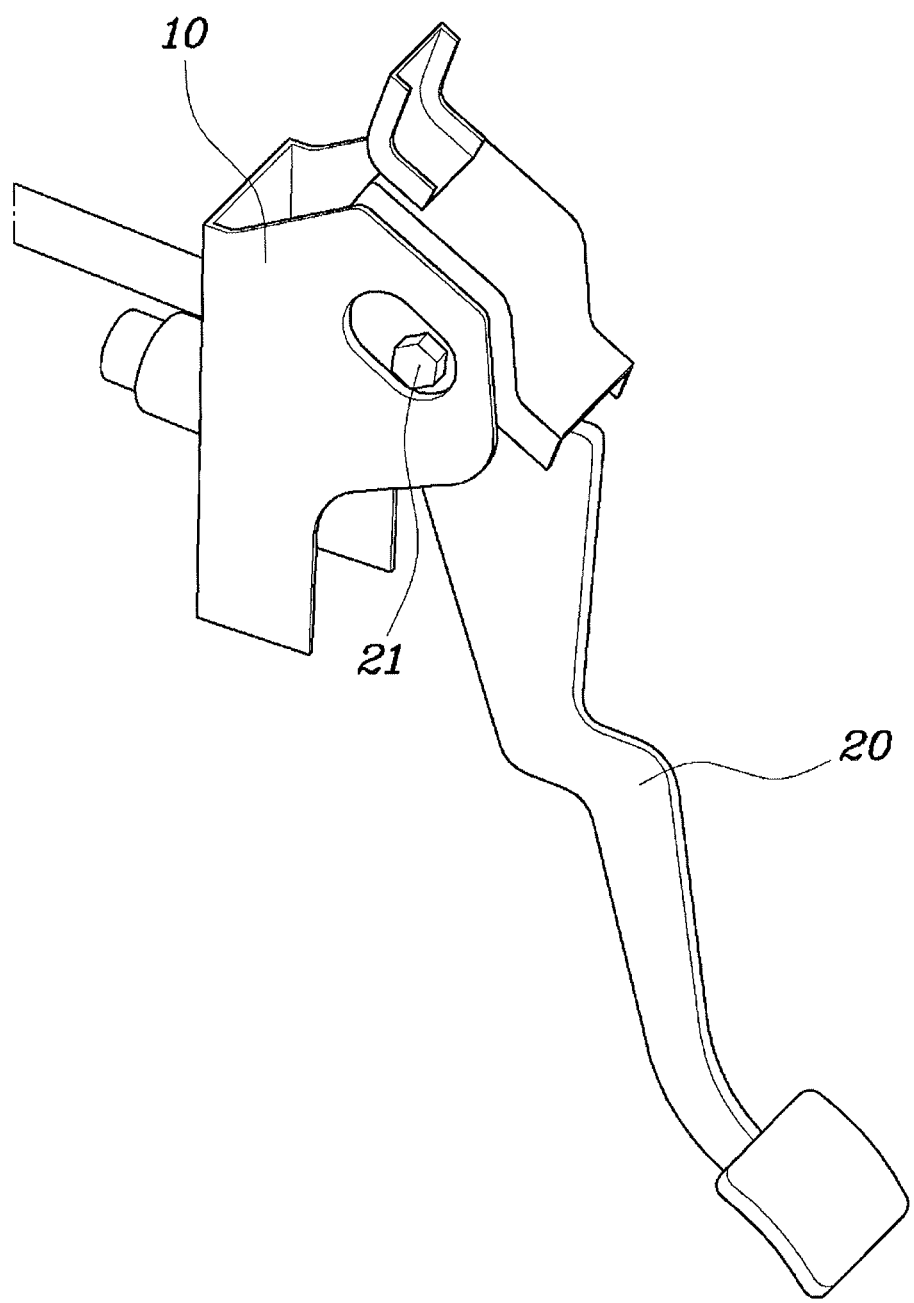
FIGS. 1 and 2 are a perspective view and a side view of a clutch pedal to which an exemplary apparatus for reducing an effort is applied according to the present invention.

It should be understood that the appended drawings are not necessarily to scale, presenting a somewhat simplified representation of various preferred features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The apparatus for reducing a clutch pedal effort for a vehicle according to the present invention is configured to include a pedal member 10 fixedly installed in a front chassis panel (dash panel) adjacent the lower part of a driver seat; a pedal arm 20 installed in the pedal member 10 with an upper portion to be rotatable through a pedal hinge 21; a pedal arm lever 30 provided at the upper portion of the pedal arm 20 to protrude forward; a torsion lever 40, one end of which is installed to be elastically rotatable to the pedal member 10 while being positioned at the front side of the pedal arm lever 30; and a back force link 50 that is rotatably installed in the pedal member 10 between the pedal arm lever 30 and the torsion lever 40 so that one end is connected to the pedal arm lever 30 and the other end contacts the torsion lever 40, and that decreases the effort by generating turnover force when the pedal arm 20 rotates forward and increases return force when the pedal arm 20 rotates backward.

Restoration force may be applied in an initial operation of the pedal arm 20 through the pedal arm lever 30, the torsion lever 40, and the back force link 50, and a large reduction force may be applied in a latter operation.

Here, the upper portion of the pedal arm 20 is positioned in the inner space of the pedal member 10 and in this state, the upper portion of the pedal arm 20 is coupled to the pedal member 10 to be rotatable forward and backward through the pedal hinge 21.

Further, the apparatus for reducing an effort according to the present invention is configured to further include a lever shaft 61 fixedly installed in the pedal member 10 by integrally penetrating the lower end of the torsion member 40 and both surfaces of the pedal member 10; and a torsion spring 62 which is wound thereon and is installed in such a manner that one end is coupled to the lever shaft 61 and the other end is coupled to the torsion lever 40, and provides elastic force to the torsion lever 40 so that the torsion lever 40 maintains a continuous contact state with the back force link 50.

The torsion lever 40 is installed to be inclined with the lower end of the torsion lever coupled to the pedal member 10 being positioned on a front side further than an upper end so as to maintain a continuous contact state with the back force link 50 when the pedal arm 20 rotates.

Further, a protrusion 41 that generates turnover force in the pedal arm 20 and increases a return force by actuation with the back force link 50 protrudes on one surface of the torsion lever 40, which contacts the back force link 50 and the protrusion 41 is formed to protrude from one surface of the torsion lever 40 through an inclination surface 42 which is inclined downward and passes through the protrusion 41, and as a result, one surface up to the lever shaft 61 becomes a sliding surface 43.

The back force link 50 according to the present invention is configured to include an intermediate portion 51 which is positioned between the pedal arm lever 30 and the torsion lever 40 and penetrated by a link shaft 63 fixed to the pedal member 10; a front rod portion 52 which is extended to an upper front side from the intermediate portion 51 and coupled to a link pin 64 that contacts the protrusion 41 and the sliding surface 43 of the torsion lever 40; and a rear rod portion 54 which is extended to an upper rear side from the intermediate portion 51, has a link slot 53 formed in a longitudinal direction, and is connected with the pedal arm lever 30 through a lever connection pin 65 that moves along the link slot while integrally penetrating the link slot 53 and the pedal arm 30.

That is, the back force link 50 has a structure formed in a cross section shape and the intermediate portion 51 corresponding to an apex is positioned in a lower portion and the front rod portion 52 and the rear rod portion 54 which are branched from the intermediate portion 51 at a predetermined angle are extended to the upper side of the intermediate portion 51.

Further, in order to generate the turnover force in the pedal arm 20 and increase the return force when the pedal arm 20 is actuated, the link shaft 63 is installed to be positioned lower than the link pin 64 and simultaneously, the lever connection pin 65 is installed to be positioned between the link shaft 63 and the link pin 64.

In addition, the link slot 53 is formed in a straight-line or substantially straight-line shape in the longitudinal direction of the rear rod portion 54 so that the back force link 50 can rotate around the link shaft 63 when the pedal arm 20 rotates.

Hereinafter, an operation of an apparatus for reducing a clutch pedal effort for a vehicle according to various embodiments of the present invention will be described.

Figure 2:
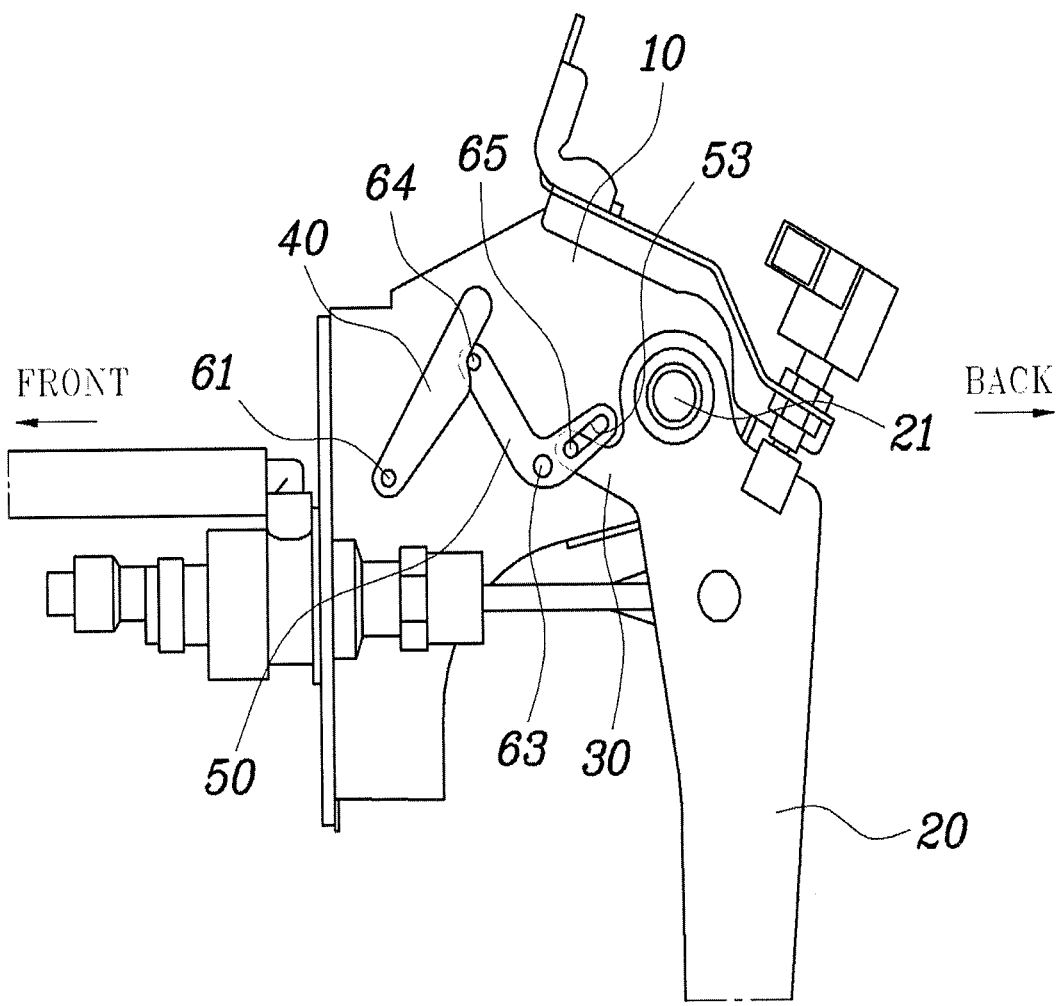
Figure 3:
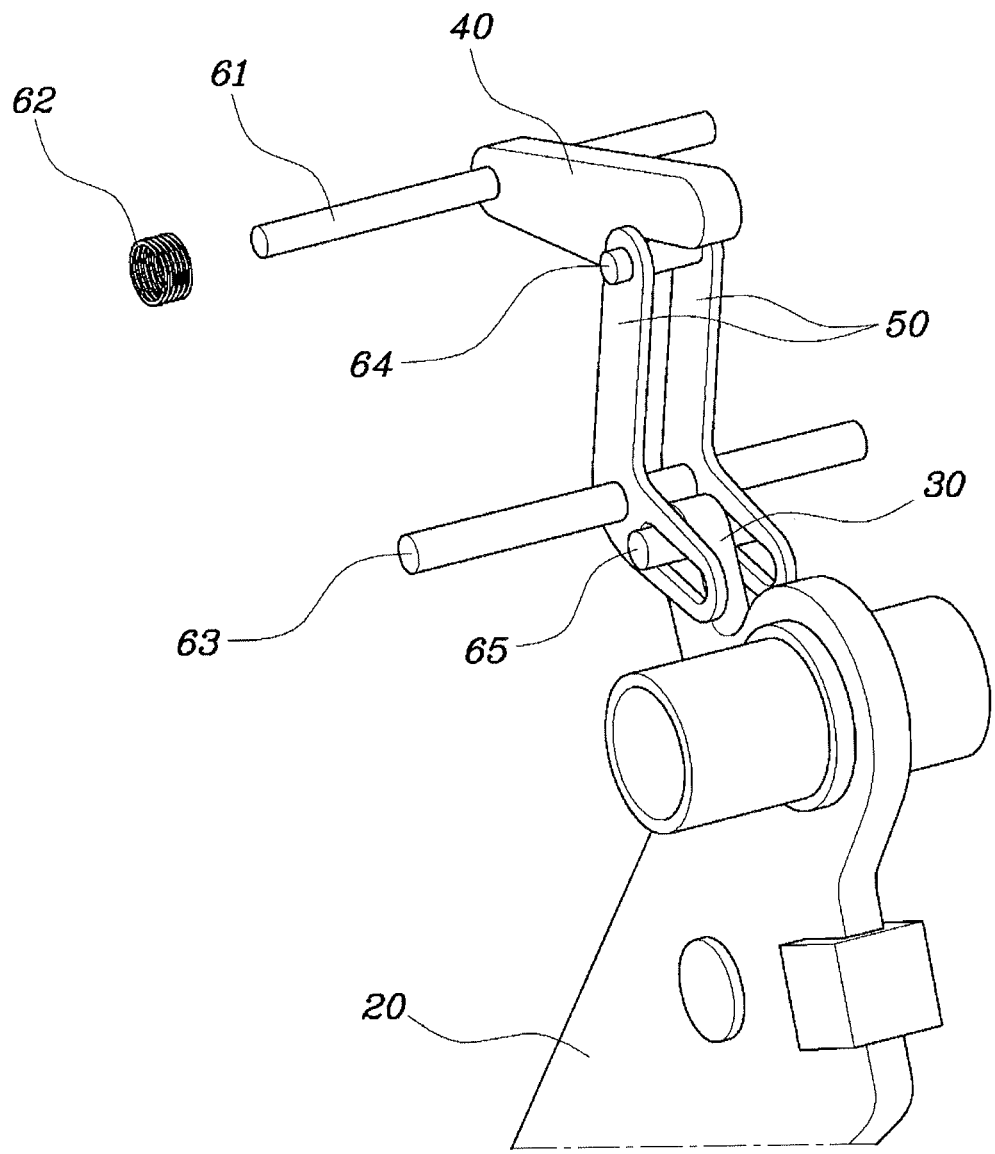
FIGS. 3 and 4 are a perspective view and a side view of an exemplary apparatus for reducing a clutch pedal effort according to the present invention.
Figure 4:
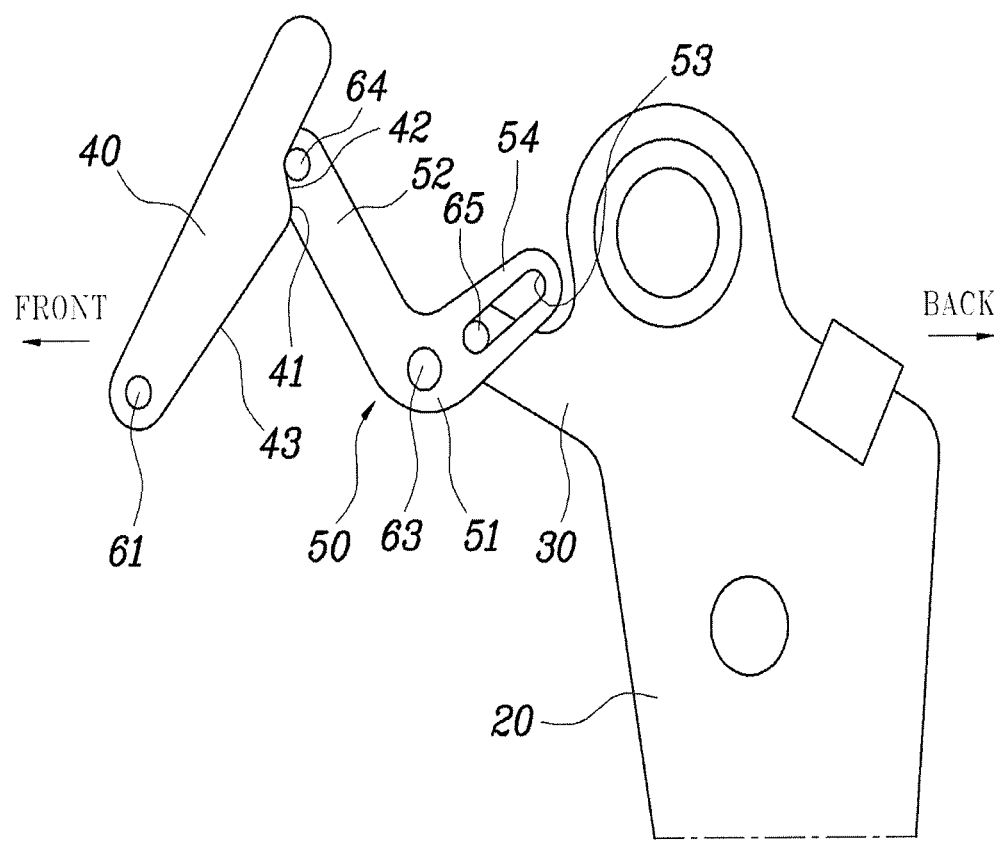

The states of FIGS. 2 and 4 are a state before the driver presses the pedal arm 20 or an initial state before the driver presses the pedal arm 20, and in this case, the lever connection pin 65 is positioned at the end of the bottom of the link slot 53, and simultaneously, the link pin 64 is positioned at the end of the top of the inclination surface 42 as in the state illustrated in FIG. 4.

Figure 5:
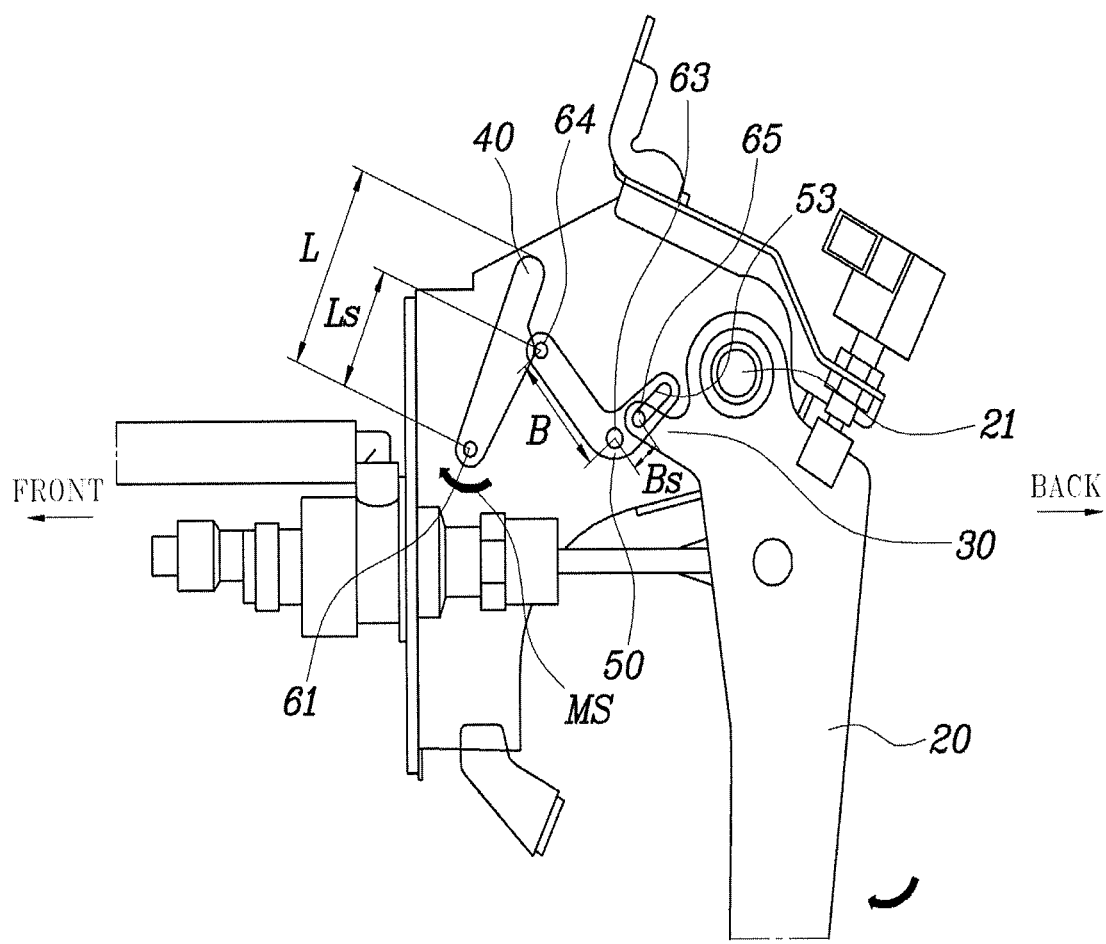
FIG. 5 is a diagram illustrating a state in initially operating a pedal arm.

FIG. 5 illustrates an initial operation state of the pedal arm 20, and in this case, the back force link 50 receives force to rotate clockwise around the link shaft 63 in the illustrated state due to the structure of the inclination surface 42 of the torsion lever 40 and the pedal arm 20 receives force to rotate counterclockwise around the pedal hinge 21 by the clockwise rotational force of the back force link 50. Therefore, complete return of the pedal arm 20 may be induced and a more complete connection of the clutch disk and the flywheel may be achieved, thereby sufficiently using the apparatus for reducing a clutch pedal effort without damage to the part even in a high-powered vehicle having a high engine output.

Moreover, when the initial state of FIGS. 2 and 4 is changed to the initial operation state of FIG. 5, as the pedal arm 20 rotates forward and the back force link 50 rotates counterclockwise around the link shaft 63, the link pin 64 moves toward the protrusion 41 along the inclination surface 42 of the torsion lever 40, and during this process, reaction force by compression of the torsion spring 62 is transferred to the pedal arm 20, and as a result, the reaction force is generated in the opposite direction of a driver's load applied to the pedal arm 20. Therefore, the effort felt by the driver is gradually increased and in this case, the driver perceives the reaction force transferred from the pedal arm 20 to perceive an operation state of the pedal arm 20.

In addition, at the moment when the link pin 64 reaches a maximum apex of the protrusion 41 by continuous forward rotation of the pedal arm 20, compression of the torsion spring 62 becomes maximized, and as a result, repulsive force becomes maximized and in this case, the effort felt by the driver also becomes maximized.

Figure 6:
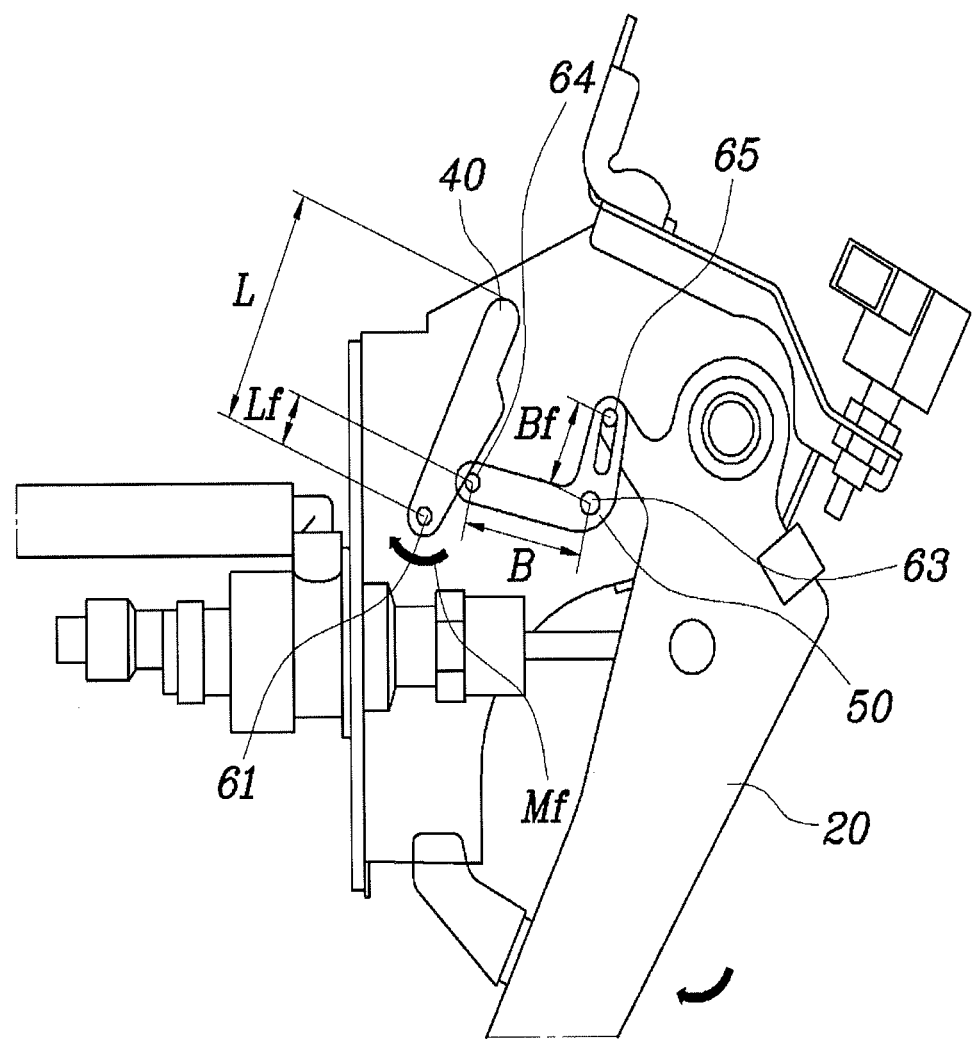
FIG. 6 is a diagram in a full-stroke operation state of the pedal arm.

Further, when the link pin 64 passes through the protrusion 41 by the continuous forward rotation of the pedal arm 20, the link pin 64 contacts the sliding surface 43 of the torsion lever 40 as in the state of FIG. 6. Therefore, this state becomes the full stroke operation state of the pedal arm 20, and in this case, the clutch is disconnected.

That is, when the link 64 enters the sliding surface 43 through the protrusion 41, while the torsion spring 62 which is maximally compressed is decompressed again, the repulsive force of the torsion spring 62 is gradually decreased. Therefore, the reaction force of the torsion spring 62 applied to the pedal arm 20 is rapidly decreased and simultaneously, the effort felt by the driver is also decreased, and as a result, fatigue of the driver is decreased when actuating the pedal arm 20 due to the decreased effort.

Further, when the link pin 64 enters the inclination surface 42 of the torsion lever 40 again while the pedal arm 20 that is rotated forward returns backward, even in this case, the complete return of the pedal arm 20 may be induced through the structure of the inclination surface 42 to achieve more complete connection between the clutch disk and the flywheel.

The back force formed in the full stroke operation of the pedal arm 20 will be described below.

First, in the initial operation of the pedal arm 20 illustrated in FIG. 5, force Fs received by the level connection pin 65 is acquired by an equation described below:

$$Fs=Ms*(1/Ls)*(B/Bs)$$

Here, Ms represents the torsion spring force compressed in the initial operation, Ls represents a distance between the center of the lever shaft 61 and the center of the link pin 64, B represents a distance between the center of the link shaft 63 and the center of the link pin 64, and Bs represents a distance between the center of the link shaft 63 and the center of the lever connection pin 65.

Next, in the full stroke operation state of the pedal arm 20 illustrated in FIG. 6, force Ff received by the level connection pin 65 is acquired by an equation described below:

$$Ff=Mf*(1/Lf)*(B/Bf)$$

Here, Mf represents the torsion spring force compressed in the full stroke operation of the pedal arm 20, Lf represents a distance between the center of the lever shaft 61 and the center of the link pin 64, B represents a distance between the center of the link shaft 63 and the center of the link pin 64, and Bf represents a distance between the center of the link shaft 63 and the center of the lever connection pin 65.

Accordingly, a back force increase value, $(Ff/Fs)=R*(Ls/Lf)*(Bs/Bf)$. Here, R, as a rotation moment increase ratio generated by the torsion spring 62 when the back force link 50 pushes the torsion lever 40, is acquired by an equation of $R=(Mf/Ms)$.

As one example, it is assumed that R=1.5 times, Ls=80 mm, Lf=20 mm, Bs=15 mm, and Bf=20 mm, the back force increase value (Ff/Fs)=4.5 times may be acquired. That is, the large force of a maximum reduction force 4.5 kgf may be acquired relative to initial restoration force 1 kgf.

Further, when a difference between a value of Ls and a value of Lf is tuned to be large as necessary such as a type of the clutch pedal or a propensity of a customer, whereas a difference between a value of Bs and a value of Bf is tuned to be small, generation of a still larger reduction force may be implemented.

As described above, according to various embodiments of the present invention, in the initial operation and the rear return of the pedal arm 20, when the link pin 64 is positioned on the inclination surface 42 of the torsion lever 40, the complete return of the pedal arm 20 may be induced to achieve a more complete connection between the clutch disk and the flywheel, and as a result, the apparatus for reducing an effort may be sufficiently used without damage to the part even in the high-powered vehicle having a high engine output.

Further, when the link pin 64 enters the sliding surface 43 through the protrusion 41 of the torsion lever 40 according to the full stroke operation of the pedal arm, the reaction force of the torsion spring 62 is gradually decreased while the compression of the torsion spring 62 is released. Therefore, the effort transferred to the pedal arm 20 may be significantly reduced, and as a result, fatigue of the driver by the operation of the pedal arm 20 may be significantly reduced.

For convenience in explanation and accurate definition in the appended claims, the terms "upper" or "lower", "front" or "rear", "forward" or "backward", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present inven-

What is claimed is:

1. An apparatus for reducing a clutch pedal effort for a vehicle comprising:
    a pedal arm lever provided at an upper portion of a pedal arm and protruding forward;
    a torsion lever, a first end of which is rotatable with respect to a pedal member and positioned at a front side of the pedal arm lever; and
    a back force link rotatably installed in the pedal member between the pedal arm lever and the torsion lever so that a first end of the back force link is connected to the pedal arm lever and a second end of the back force link contacts the torsion lever, thereby decreasing the effort by generating turnover force when the pedal arm rotates forward and increasing return force when the pedal arm rotates backward,
    wherein a surface of the torsion lever contacting the back force link includes:
        an inclination surface at an upper end of the torsion lever and inclining downward;
        a sliding surface at a lower end of the torsion lever; and
        a protrusion protruding from the torsion lever between the inclination surface and the sliding surface, wherein the protrusion generates the turnover force in the pedal arm and increases the return force by actuation with the back force link, and
    wherein the back force link includes:
        an intermediate portion which is positioned between the pedal arm lever and the torsion lever and penetrated by a link shaft fixed to the pedal member;
        a front rod portion which is extended to an upper front side from the intermediate portion and coupled to a link pin that contacts the protrusion and the sliding surface of the torsion lever; and
        a rear rod portion which is extended to an upper rear side from the intermediate portion, has a link slot formed in a longitudinal direction of the rear rod portion, and is connected with the pedal arm lever through a lever connection pin that moves along the link slot in the longitudinal direction while integrally penetrating the link slot and the pedal arm.

2. The apparatus of claim 1, further comprising:
    a lever shaft fixedly installed in the pedal member by integrally penetrating the lower end of the torsion lever and both surfaces of the pedal member, and served as a rotation center of the torsion lever; and
    a torsion spring which is wound on the lever shaft and is installed with a first end coupled to the lever shaft and a second end coupled to the torsion lever, and which provides elastic force to the torsion lever so that the torsion lever maintains a continuous contact state with the back force link.

3. The apparatus of claim 1, wherein:
    the torsion lever is installed to be inclined with a lower end of the torsion lever coupled to the pedal member and positioned to the front side further than an upper end to maintain a continuous contact state with the back force link when the pedal arm rotates.

4. The apparatus of claim 1, wherein:
    the link shaft is positioned lower than the link pin to generate the turnover force in the pedal arm and increase the return force when the pedal arm is actuated; and
    the lever connection pin is positioned between the link shaft and the link pin.

5. The apparatus of claim 1, wherein:
    the link slot is formed in a substantially straight-line shape in the longitudinal direction of the rear rod portion so that the back force link rotates around the link shaft when the pedal arm rotates.

* * * * *